Aug. 16, 1966   V. G. MAGORIEN   3,266,825
QUICK-CONNECT PIPE COUPLING
Filed Oct. 16, 1963
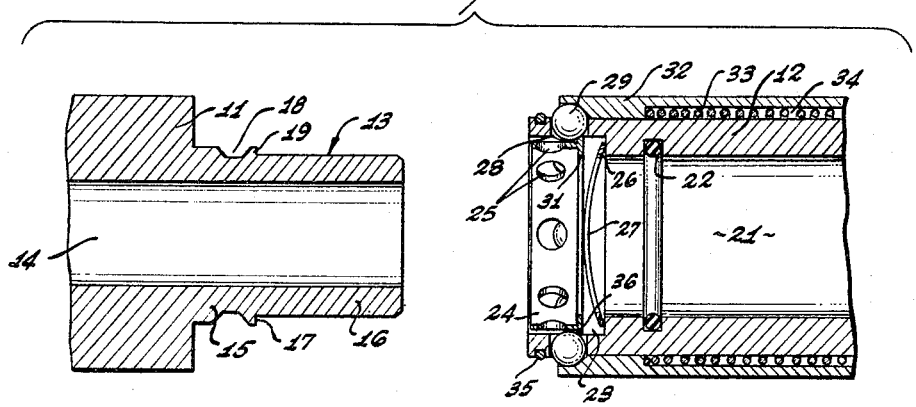
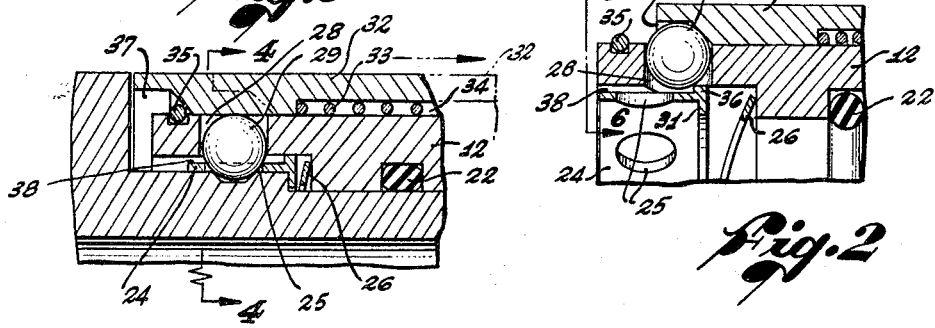
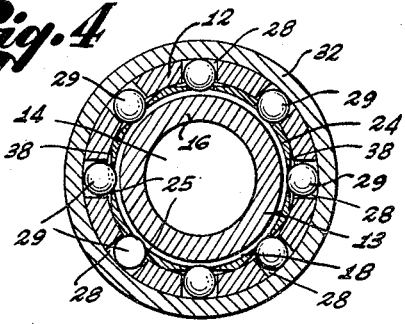
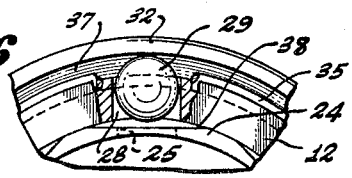
INVENTOR.
VINCENT G. MAGORIEN
BY Zulwider, Patton, Rieber
Lee, and Utecht
ATTORNEYS

United States Patent Office 3,266,825
Patented August 16, 1966

3,266,825
QUICK-CONNECT PIPE COUPLING
Vincent G. Magorien, Reseda, Calif., assignor to Seaton-Wilson Manufacturing Co., Burbank, Calif., a corporation of California
Filed Oct. 16, 1963, Ser. No. 316,717
4 Claims. (Cl. 285—277)

The present invention relates generally to coupling devices and more particularly to an improved coupling connectable by unidirectional motion. The coupling of this invention, while particularly useful for the connection and disconnection of fluid-carrying lines, is also adapted for general application and use, fluid or otherwise.

It is often advantageous for a coupling to be connectable by the parts thereof having one continuous relative motion by which the coupling assembly can be rapidly yet positively coupled. It is much easier for personnel to simply push a coupling half or an attached fluid line or hose, in order to connect the two halves of a coupling assembly together. In the case of heavy lines and couplings, it is not only advantageous to have such a unidirectionally operated device, but for one man operation it may be almost mandatory.

Previous attempts to supply such quick-connect couplings have involved complicated and expensive mechanisms which, in addition to their initial cost, have presented the usual complications of intricate structures.

It is therefore an object of the present invention to provide an improved quick-connect coupling of simple and inexpensive construction.

Another object of this invention is the provision of a quick-connect coupling which is reliable and positive and provides for coupling of the assembly in one continuous motion.

A further object of this invention is the provision of a new and improved coupling employing radially movable locking means and an axially movable locking sleeve for holding the locking means in locking position, in which the locking means are held in unlocking position while the coupling is disconnected and, in turn, hold the locking sleeve in retracted position.

These and other objects and features of the invention will be readily apparent to those skilled in the art from the following specification and the appended drawing in which:

FIGURE 1 is a longitudinal sectional view through the coupling according to the present invention in disconnected position;

FIGURE 2 is a partial sectional view of the end of the female portion of the coupling;

FIGURE 3 is a partial longitudinal sectional view of the coupling in connected position;

FIGURE 4 is a transverse sectional view of the coupling taken on the line 4—4 of FIGURE 3;

FIGURE 5 is a perspective view of a locking ball retainer for the coupling; and

FIGURE 6 is a partial transverse sectional view on the line 6—6 of FIGURE 2.

The embodiment of the invention selected for illustration in the drawing is a quick-connect coupling particularly useful in the connection and disconnection of fluid-carrying lines and including a male body member 11 and a female body member 12. The back ends of the body portions 11 and 12 are provided with connection means, not shown, for attachment to fluid lines or hoses in conventional manner.

The male body mmeber 11 has a tubular male member 13 projecting forwardly therefrom and a fluid passage 14 extending therethrough. The tubular male member 13 includes a rearward, larger-diameter portion 15 and a forward, smaller-diameter portion 16 providing at their junction a forwardly directed abutment face 17. An annular locking groove is cut in the larger-diameter portion 15 adjacent the forward edge thereof and provides, between the groove and the abutment face 17, an annular locking land 19.

The female body member 12 has a bore 21 therethrough, the forward end of which is adapted to receive the tubular male member 13 and to be sealed thereto against passage of fluid by a sealing ring 22 mounted in an annular slot in the wall defining the bore 21. The forward end of the female body mmeber 12 is counterbored to provide a forward chamber 23 therein in which is disposed an annular ball retainer 24 having circumferentially spaced ball holes 25 therethrough. A flat spring or wave washer 26 is connected to the rear face of the retainer 24 at 27 and bears against the back wall of chamber 23 to bias retainer 24 forwardly of the female body member 12.

A plurality of circumferentially spaced openings 28 extend radially through the end of the female body member 12 to the chamber 23. Locking balls are disposed in the openings 28 for movement therein radially of the body member 12. The holes 25 in the ball retainer are preferably of smaller diameter than the balls 29 so that the balls will be captured and held even if the mechanism of the coupling is purposely tripped without the insertion of the male member therein.

The annular retainer 24 has an inwardly projecting flange or shoulder 31 at its back having a hole therethrough allowing free passage of the forward portion 16 of the male member 13 but engaged by the abutment face 17 to effect backward movement of the retainer within the chamber 23 against its bias. A locking sleeve 32 surrounds the female body member 12 to be axially movable relative thereto and is biased forwardly by the coil spring 33 disposed within a cylindrical recess 34 in the inner sleeve surface. A snap ring 35 is received in an annular groove near the end of the body member 12 to limit the forward movement of the sleeve 32 to the position shown in FIGURE 3.

An outwardly projecting flange or shoulder stop 36 is provided at the back edge of the retainer 24 which limits the forward, disconnect position of the retainer by engagement with the balls 29 when in their disconnect position of FIGURES 1 and 2, in which the balls 29 have moved radially outwardly in the holes 28 into an annular pocket or groove 37 in the end of the locking sleeve 32. The retainer 24 is thereby prevented from being ejected out of the chamber 23 in the female body member 12 by the bias of the spring 26. For this purpose the diameter of the annular groove or pocket 37 is dimensioned with relation to the diameters of the balls 29 so that the balls 29 extend inwardly of the outer edge of the flange or shoulder stop 36.

The flange or shoulder stop 36 is provided in the specific embodiment shown by the material which is left at the rear periphery of the retainer 24 by milling flat surfaces 38 in the outer periphery of the carriage 24 around the openings 25. The rear portions of the surfaces 38 are located beneath the balls 29 in the disconnect position, to be engaged thereby to resist forceful movement of the sleeve 32 toward its forward, locking position while the coupling is disconnected. The flat surfaces 38 also cooperate with the balls 29 to prevent rotation of the retainer 24 relative to the female body 12 which might otherwise move the openings 25 out of the axial planes in which balls 29 are located.

The operation of the embodiment of the invention illustrated in the drawing will now be described.

In the disconnected condition of the coupling, the locking sleeve 32 will be maintained in its retracted position by the balls 29 which are held in their outer positions, within the annular groove or pocket 37 in the end of the sleeve, by the engagement of the retainer 24 therewith. Depending on the relative strengths of the springs 26 and 33, the balls will be held upward by their engagement either with the shoulder stop 36 or with the flat surface 38, and in either case the sleeve 32 will be locked in the retracted position until the ball retainer 24 is moved rearwardly in the chamber 23 in the end of the female body 12. To couple the elements of the coupling together, the male member 13 is simply inserted as far as it will go into the bore 21 in the female body member 12. This may be done by one continuous motion of the male member only, by one continuous motion of the female member only in the reverse direction, or by continuous relative movement of the male and female members. In any event, the connection and coupling can be made by continuous unidirectional movement.

In this coupling operation the male member 13 enters the bore 21 and is sealed therein by the sealing ring 22. The male member 13 will continue moving into the bore 21 until the abutment face 17 on the locking land 19 engages the flange 31 on the ball retainer 24. The ball retainer is then moved rearwardly in chamber 23 by the male member, against the bias of spring 26, the flat surface 37 moving rearwardly of the balls 29 to present the holes 25 thereto. The balls 29 are then cammed inwardly, by the inclined wall on the sleeve 32 defining the end of pocket 37, in the openings 28 to project through the holes 25 in the ball retainer into the groove 18 in the larger-diameter portion 15 of the male member 13. This inward movement of the balls 29 fully releases the locking sleeve 32 which snaps forwardly, under the bias of its spring 33, into its ball locking position of FIGURE 3. The body members 11 and 12 are then locked together by the balls 29 on the female body member 12 extending into the groove 18 in the male member 13 and being held in their inward positions by the locking sleeve 32. The body members 11 and 12 are thereby held against separation by the balls 29 engaging the annular locking land 19.

In the disconnecting operation, the two halves of the assembly being coupled together as shown in FIGURE 3, the sleeve 32 is pulled to the rear, by direct manual engagement, by means of a lanyard, or by an automatic device such as a solenoid. When the groove or pocket 37 comes opposite the balls 29, they are cammed outwardly in the openings 28 by the inclined rear surface of the locking land 19 which thereby is free to move rearwardly with the male member 13. The ball retainer 24 moves forwardly under its bias to follow the withdrawing movement of the male member until it assumes the position of FIGURES 1 and 2 with the shoulder stop 36 engaging the balls 29 to limit the forward movement of the ball retainer in chamber 23. The parts are then held in this position, as previously described, with the sleeve 32 locked in its retracted position by the balls 29 against both accidental and intentional release thereof from the outside. The structure of the present invention thereby positively locks the sleeve against tripping except by intentional rearward movement of the ball retainer 24.

While the specific embodiment of the invention illustrates a plurality of balls 29 providing the locking elements for the coupling, it will be understood that pins or rollers may be substituted therefor. Also, while the ball retainer 24 is shown biased by a flat spring, wave washer 26, it will be apparent that coil springs or other biasing means may be substituted therefor. The ball retainer does not protrude externally of the female body member 12 and thus is not subject to accidental movement to trip the sleeve 32. On the other hand, a special tool may readily be engaged with the ball retainer to move it rearwardly for intentional tripping of the locking sleeve.

While certain preferred embodiments of the invention have been specifically illustrated and described, it will be understood that the invention is not limited thereto as many variations will be apparent to those skilled in the art, and the invention is to be given its broadest interpretation within the terms of the following claims.

I claim:
1. A quick-connect coupling comprising: a female member having substantially radial openings therein; a male member insertable in said female member to connect the coupling, said male member including an annular locking land thereon rearwardly of its forward end; locking elements in said female member openings movable substantially radially therein into inner positions interlocking with said locking land on said male member and into outer positions releasing said male member; a locking sleeve movably mounted on said female member; means biasing said locking sleeve forwardly into a locking position where it holds said locking elements in their inner positions, said sleeve being movable rearwardly to a retracted position permitting said locking elements to move to their outer positions; an annular retainer mounted in said female member so as to receive said male member therethrough, said retainer having openings therethrough through which the locking elements project into interlocking engagement with the locking land on the male member; means biasing said retainer to a forward position to hold the locking elements in their outer positions and said sleeve in retracted position; a shoulder on said retainer extending inwardly thereof; an abutment face on said male member engaging said shoulder to move said retainer rearwardly relative to the female member to position the retainer openings in substantially radial alignment with said locking elements for movement thereof into coupling locking positions; outwardly extending stop means on said retainer rearwardly of the forward end thereof and engaging said locking elements in their outer positions to limit the forward movement of the retainer with respect to the female member; and flat surfaces on the outer periphery of said retainer about the openings therethrough positioned beneath the locking elements in the forward position of the retainer to positively lock said locking elements in their outer positions and the locking sleeve in retracted position against tripping of the locking sleeve except by rearward movement of the retainer, said flat surfaces on the retainer periphery also cooperating with said locking elements to prevent rotation of the retainer to thereby radially index the openings therethrough with the locking elements.

2. A quick-connect coupling comprising: a female member having substantially radial openings therein; a male member insertable in said female member to connect the coupling, said male member including an annular locking land thereon rearwardly of its forward end; locking elements in said female member openings movable substantially radially therein into inner positions interlocking with said locking land on said male member and into outer positions releasing said male member; a locking sleeve movably mounted on said female member; means biasing said locking sleeve forwardly into a locking position where it holds said locking elements in their inner positions, said sleeve being movable rearwardly to a retracted position permitting said locking elements to move to their outer positions; an annular retainer mounted in said female member so as to receive said male member therethrough, said retainer having openings therethrough through which the locking elements project into interlocking engagement with the locking land on the male member; means biasing said retainer to a forward position; a shoulder on said retainer extending inwardly thereof; an abutment face on said male member engaging said shoulder to move said retainer rearwardly relative to the female member to position the retainer openings in substantially radial alignment with said locking elements for movement thereof into coupling locking positions; outwardly extending stop means on said retainer rearwardly of the forward end thereof and engaging said locking elements in their outer positions to limit the forward movement of the retainer with respect to the female member; and means on said retainer engaging with said locking elements when said locking elements are in their outer positions and said retainer is in its forward position to positively lock said locking sleeve in its retracted position.

3. A quick-connect coupling comprising: a female member having substantially radial openings therein; a male member insertable in said female member to connect the coupling, said male member including an annular locking land thereon rearwardly of its forward end; locking elements in said female member openings movable substantially radially therein into inner positions interlocking with said locking land on said male member and into outer positions releasing said male member; a locking sleeve movably mounted on said female member; means biasing said locking sleeve forwardly into a locking position where it holds said locking elements in their inner positions, said sleeve being movable rearwardly to a retracted position permitting said locking elements to move to their outer positions; an annular retainer mounted in said female member so as to receive said male member therethrough, said retainer having openings therethrough through which the locking elements project into interlocking engagement with the locking land on the male member; means biasing said retainer to a forward position; a shoulder on said retainer extending inwardly thereof; an abutment face on said male member engaging said shoulder to move said retainer rearwardly relative to the female member to position the retainer openings in substantially radial alignment with said locking elements for movement thereof into coupling locking positions; outwardly extending stop means on said retainer rearwardly of the forward end thereof and engaging said locking elements in their outer positions to limit the forward movement of the retainer with respect to the female member; and means on said retainer engaging with said locking elements when said locking elements are in their outer positions and said retainer is in its forward position to positively lock said locking sleeve in its retracted position, said locking elements including transverse dimensions greater than the dimensions of said holes through said retainer so that said locking elements are held in the female member by the retainer in the event the retainer is moved rearwardly without a male member in place so as to trip said locking sleeve for movement under its bias into its forward position.

4. A quick-connect coupling comprising: a female member having substantially radial openings therein; a male member insertable in said female member to connect the coupling, said male member including an annular locking land thereon rearwardly of its forward end; locking elements in said female member openings movable substantially radially therein into inner positions interlocking with said locking land on said male member and into outer positions releasing said male member; a locking sleeve movable mounted on said female member; means biasing said locking sleeve forwardly into a locking position where it holds said locking elements in their inner positions, said sleeve being movable rearwardly to a retracted position permitting said locking elements to move to their outer positions; an annular retainer mounted in said female member so as to receive said male member therethrough, said retainer having openings therethrough through which the locking elements projects into interlocking engagement with the locking land on the male member; means biasing said retainer to a forward position; a substantially forwardly facing abutment face on said retainer; a substantially forwardly facing abutment face on said male member engaging said abutment face on said retainer as said male member is inserted into said female member to move said retainer rearwardly relative to the female member to thereby position the retainer openings in substantially radial alignment with said locking elements for movement thereof into coupling locking position; means on said retainer rearwardly of the forward end thereof engaging with said locking elements when said locking elements are in their outer positions and said retainer is in its forward position to positively lock said locking sleeve in its retracted position; and stop means on said retainer rearwardly of its forward end and engaging said locking elements in their outer positions to limit and define the forward position of said retainer with respect to the female member.

References Cited by the Examiner

UNITED STATES PATENTS

| 2,279,146 | 4/1942 | Schneller | 285—277 |
| 2,568,516 | 9/1951 | Scheiwer | 285—277 X |
| 2,646,994 | 7/1953 | Scheiwer | 137—614.04 |
| 2,665,928 | 1/1954 | Omon et al. | 137—614.04 X |
| 2,673,750 | 3/1954 | Scheiwer | 285—277 |
| 3,131,905 | 5/1964 | Nyberg | 137—614.04 X |

FOREIGN PATENTS

| 1,219,908 | 12/1959 | France. |

CARL W. TOMLIN, *Primary Examiner.*

THOMAS F. CALLAGHAN, *Examiner.*